(12) United States Patent
Ekpenyong et al.

(10) Patent No.: US 9,154,277 B2
(45) Date of Patent: Oct. 6, 2015

(54) RESOURCE ALLOCATION AND SIGNALING FOR APERIODIC SOUNDING

(75) Inventors: Anthony Ekpenyong, Farmers Branch, TX (US); Vikram Chandrasekhar, Dallas, TX (US); Pierre Bertrand, Antibes (FR)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 193 days.

(21) Appl. No.: 13/240,010

(22) Filed: Sep. 22, 2011

(65) Prior Publication Data

US 2013/0077574 A1    Mar. 28, 2013

Related U.S. Application Data

(60) Provisional application No. 61/385,277, filed on Sep. 22, 2010.

(51) Int. Cl.
*H04W 72/04* (2009.01)
*H04L 5/00* (2006.01)
*H04L 27/26* (2006.01)

(52) U.S. Cl.
CPC ............. *H04L 5/0023* (2013.01); *H04L 5/005* (2013.01); *H04L 5/0085* (2013.01); *H04L 5/0094* (2013.01); *H04L 27/2613* (2013.01)

(58) Field of Classification Search
CPC ...... H04L 5/0085; H04L 5/0094; H04L 5/005; H04L 27/2613; H04W 72/1284; H04W 72/1294; H04W 72/1263; H04W 72/14
USPC ......... 370/280, 276, 328–329, 336, 256, 344, 370/252
See application file for complete search history.

(56) References Cited

U.S. PATENT DOCUMENTS

| | | | |
|---|---|---|---|
| 8,000,273 B2 * | 8/2011 | He et al. ....................... | 370/280 |
| 8,260,356 B2 * | 9/2012 | Nam et al. .................... | 455/561 |
| 2008/0039098 A1 * | 2/2008 | Papasakellariou et al. ... | 455/442 |
| 2010/0074205 A1 * | 3/2010 | Papasakellariou et al. ... | 370/329 |
| 2011/0085458 A1 * | 4/2011 | Montojo et al. .............. | 370/252 |
| 2011/0199944 A1 * | 8/2011 | Chen et al. .................... | 370/280 |
| 2011/0268028 A1 * | 11/2011 | Stern-Berkowitz et al. .. | 370/328 |
| 2011/0310818 A1 * | 12/2011 | Lin et al. ....................... | 370/329 |
| 2012/0039273 A1 * | 2/2012 | Nam et al. ..................... | 370/329 |
| 2012/0250541 A1 * | 10/2012 | Ko et al. ........................ | 370/252 |

\* cited by examiner

*Primary Examiner* — Charles C Jiang
*Assistant Examiner* — Mohamed Kamara
(74) *Attorney, Agent, or Firm* — Ronald O. Neerings; Frank D. Cimino

(57) ABSTRACT

This patent application considers the configuration aperiodic sounding reference signal parameters by radio resource control signaling and the triggering of aperiodic SRS transmission by detection of a positive trigger in downlink control information. Transmission timing rules are also proposed to determine the valid subframes for aperiodic SRS transmission.

6 Claims, 4 Drawing Sheets

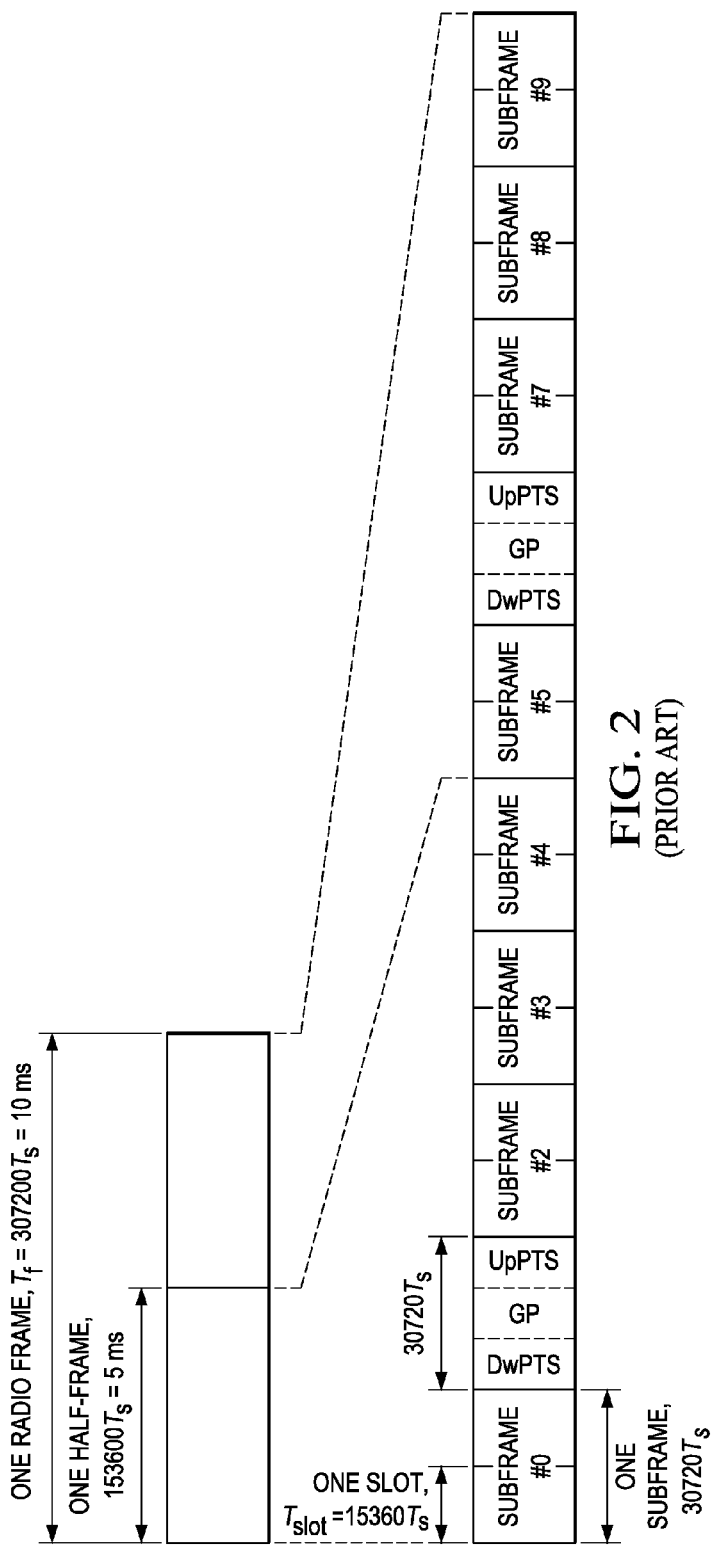
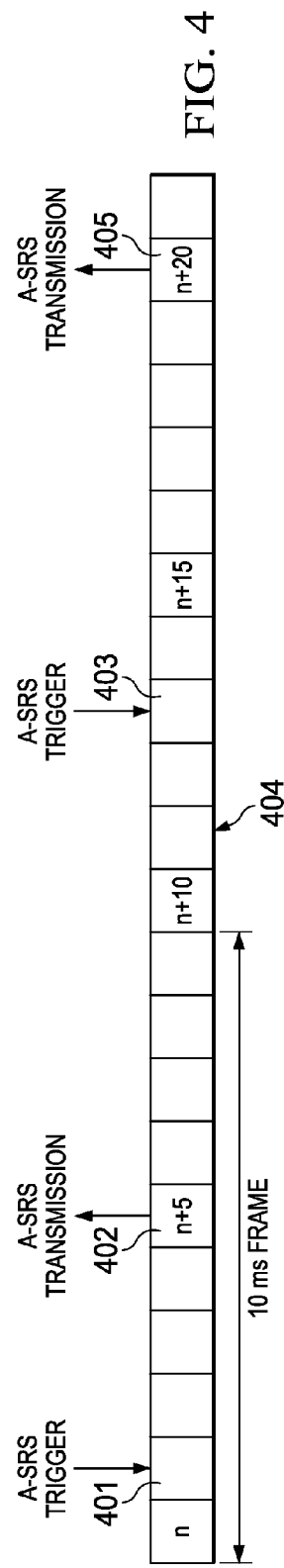
FIG. 2 (PRIOR ART)
FIG. 4

RESOURCE ALLOCATION AND SIGNALING FOR APERIODIC SOUNDING

CLAIM OF PRIORITY

This application claims priority under 35 U.S.C. 119(e)(1) to U.S. Provisional Application No. 61/385,277, filed Sep. 22, 2010.

TECHNICAL FIELD OF THE INVENTION

The technical field of this invention is wireless communication such as wireless telephony.

BACKGROUND OF THE INVENTION

The 3-GPP Evolved Universal Terrestrial Radio Access (E-UTRA) Rel. 10 LTE standard requires the support of at least 300 active non-DRX users in a 5 MHz bandwidth. This is at least a 50% increase over the Rel. 8 standard. Rel. 10 also supports uplink multiple input, multiple output (UL-MIMO) transmission. The increase in supported users and the introduction of multiple transmit antennas per user results in a need for more efficient sounding resource management if the sounding reference signal (SRS) capacity is not increased within the Rel. 10 time frame. Aperiodic sounding reference signal (SRS) transmission was adopted to efficiently manage sounding opportunities across single- and multi-antenna user equipment (UE).

The current adopted features of aperiodic SRS transmission with respect to signaling, resource allocation and transmission timing include:

A UE may be independently configured for periodic and aperiodic SRS transmission;

An exemplary scenario employs periodic sounding for timing control, power control and frequency dependent scheduling for single antenna port transmission and employs aperiodic sounding to enable frequency dependent scheduling for UL spatial multiplexing;

A similar but different set of UE specific parameters as in Rel. 8 periodic sounding is independently configured for aperiodic sounding;

Aperiodic SRS transmission is configured by radio resource control (RRC) signaling and dynamic (L1) signaling in a DCI format;

Rel. 8/9 (time/frequency/code) SRS resources are re-used for aperiodic sounding;

Cell-specific SRS configuration parameters are applicable to both periodic and aperiodic sounding;

Aperiodic sounding using Rel. 8 SRS resources is transmitted in cell-specific SRS subframes;

SRS is transmitted from all configured antenna ports in the same Single Carrier Frequency Division Multiple Access (SC-FDMA) symbol; and The SRS transmission bandwidth and starting resource block assignment are the same for all antenna ports.

Outstanding or undecided aspects of this process addressed in this invention include:

The number of states needed in the downlink control information (DCI) format conveyed on the Physical Downlink Control CHannel (PDCCH) for triggering/configuration of aperiodic SRS transmission;

The potential list of configuration parameters such as cyclic shift (CS), transmission comb, bandwidth (BW) position, transmission BW and hopping;

The partitioning of configuration parameters between RRC signaling and dynamic signaling in the PDCCH; and The transmission timing rules for aperiodic SRS transmission.

SUMMARY OF THE INVENTION

This patent application considers the outstanding signaling and resource allocation aspects and proposes transmission timing rules for aperiodic SRS.

BRIEF DESCRIPTION OF THE DRAWINGS

These and other aspects of this invention are illustrated in the drawings, in which:

FIG. 2 shows the Evolved Universal Terrestrial Radio Access (E-UTRA) Time Division Duplex (TDD) frame structure of the prior art;

FIG. 4 illustrates aperiodic SRS transmission timing in response to a detected trigger.

DETAILED DESCRIPTION OF PREFERRED EMBODIMENTS

Figure 1:
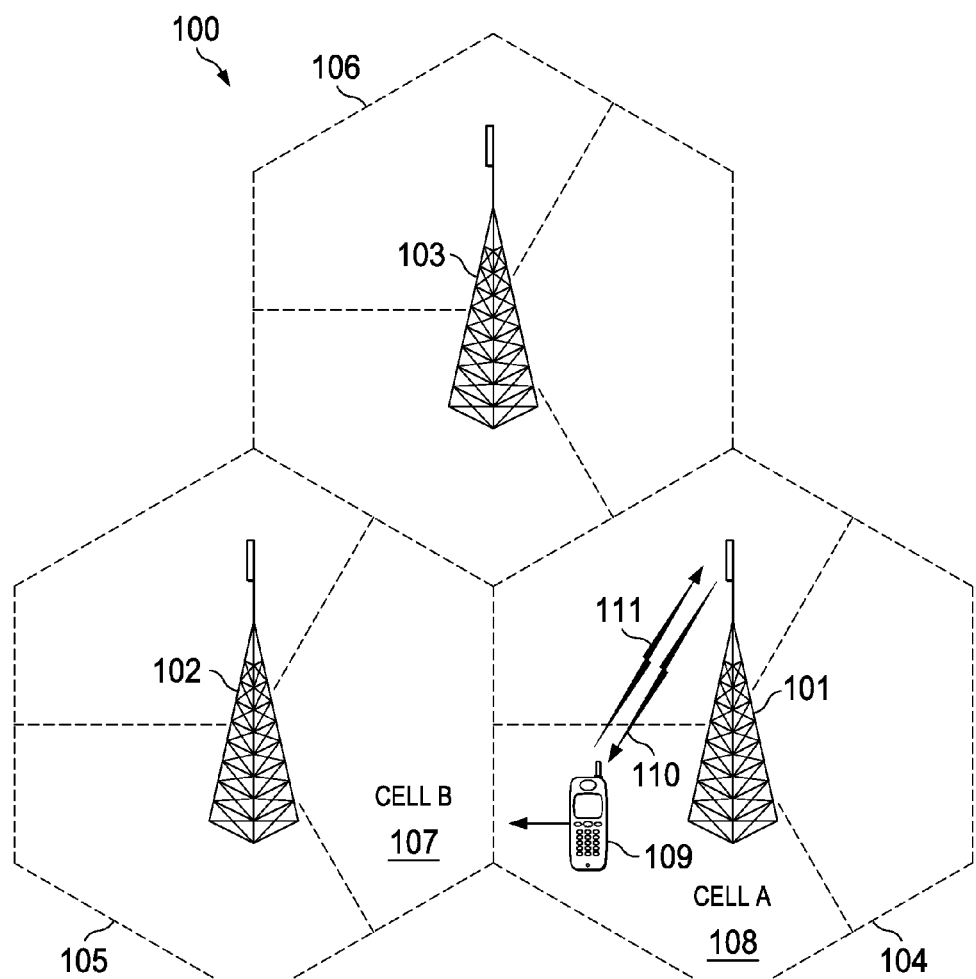
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link time or frequency or code resources 111. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Base station 101 can also configure UE 109 for aperiodic uplink sounding reference signal (SRS) transmission. Base station 101 triggers the UE for aperiodic sounding using an aperiodic SRS field in DCI formats scheduling UL grants. The UE 109 transmits SRS in a UE-specific aperiodic SRS subframe in response to the detected trigger. Base station 101 estimates uplink channel quality information (CSI) from the SRS transmission.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Con-figuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

The signaling design for triggering and configuration of aperiodic SRS should:

Minimize the impact on DL signaling overhead in order to maintain Rel. 8 DL coverage;

Focus on the typical use cases for aperiodic sounding including multi-antenna port sounding and efficient management of a fixed set of time/frequency/code resources by a larger pool of UEs and antenna ports.

In order to minimize the impact on DL signaling overhead aperiodic SRS request should only be piggy backed on a PDCCH signaling an UL grant for the same UE. To increase the triggering opportunities the aperiodic SRS trigger can also be indicated in select DCI formats scheduling DL assignments such as DCI formats 1A, 2B, and 2C. The SRS trigger is inserted in DCI format 0 for single antenna port transmission or in DCI format 4 for UL spatial multiplexing. Cell specific SRS parameters including the subframe configuration and the transmission bandwidth $C_{SRS}$ applicable to both periodic and aperiodic sounding have been adopted to the standard. Table 2 lists the UE specific parameters that are candidates for the SRS IE in the UL DCI format.

TABLE 2

| Parameter | Bit width |
|---|---|
| Transmission comb $k_{TC}$ | 1 |
| Starting PRB assignment $n_{RRC}$ | 5 |
| SRS bandwidth $B_{SRS}$ | 2 |
| Frequency hopping bandwidth $b_{hop}$ | 2 |
| Cyclic shift $n_{SRS}^{cs,p}$ | 3 |

Figure 3:
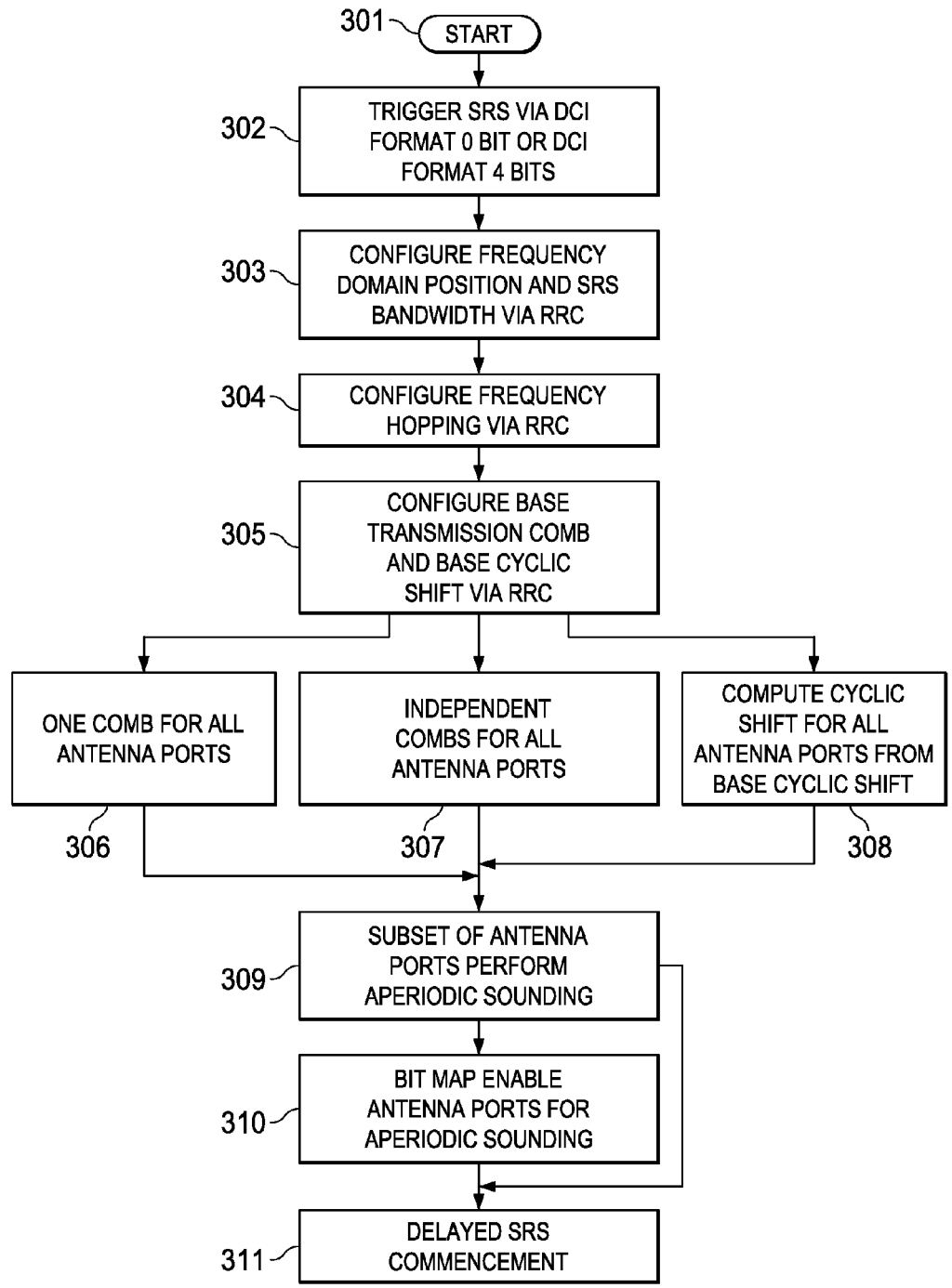
FIG. 3 illustrates the configuration and control of sounding reference signal transmission according to this invention.

FIG. 3 illustrates the control of sounding reference signaling according to this invention. This process begins at start block 301.

DCI Format 0

Major changes to DCI format 0 are not desirable because of the impact to existing specification and testing procedures. This invention includes only an SRS trigger for DCI format 0. Aperiodic SRS in DCI format 0 can be triggered by redefining existing bits or by the addition of a 1-bit field. Rel. 10 supports non-contiguous PUSCH resource allocation by re-defining the frequency hopping flag and the padded bit in DCI format 0. Since it may be possible to simultaneously configure a UE for non-contiguous PUSCH transmission and aperiodic SRS the only option for reusing existing bits is to re-define the cyclic shift indicator (CSI) field. On the other hand the CSI field may be used for signalling both cyclic shift and orthogonal cover code for Rel. 10 UL MU-MIMO transmission. Therefore this invention defines the addition of a 1-bit field (block 302).

DCI Format 4

A maximum of 13 bits are required for aperiodic SRS configuration. These can be partitioned between dynamic signalling in the PDCCH and RRC signalling.

This invention includes:

The frequency domain position starting Physical Resource Block (PRB) and the SRS bandwidth (block 303): from the second design principle aperiodic sounding operation based on these parameters are similar to their use for periodic sounding. These parameters are configured by RRC signalling;

Frequency hopping bandwidth (block 304): in Rel. 8 frequency hopping is enabled when the hopping bandwidth index $b_{hop}$ is less than the SRS bandwidth index $B_{SRS}$. An important use case for frequency hopping is when the UEs transmit power spectral density is too low for effective wide-band sounding in one subframe. Then the UE may hop across different bandwidth parts of $B_{SRS}$. This parameter is used in conjunction with the frequency domain position $n_{RRC}$ and should also be configured by RRC signaling.

Transmission comb and cyclic shift (block 305): these are the essential parameters for aperiodic SRS. This invention includes several options for configuring these parameters.

A first embodiment of this invention configures transmission comb and cyclic shift by higher layer signalling. This invention adds only 1 bit is added to DCI format 0 for aperiodic SRS activation. In a different embodiment a 2-bit field can be added to DCI format 4 so that one of three configuration parameter sets can be triggered for aperiodic SRS transmission. A base cyclic shift is configured by RRC signalling. The cyclic shifts for all configured antenna ports are implicitly determined from the signalled cyclic shift (308). Two options are possible for the transmission comb. In the first option one comb is configured for all antenna ports, the same as the signalled base transmission comb (block 306). In the second option each antenna port is independently configured with a different comb (block 307). This does not necessarily imply multiple information elements. In one embodiment only one value ($\bar{k}_{TC}$) is signalled. The UE implicitly determines the transmission comb for antenna port p as $k_{TC}^p = (\bar{k}_{TC}+p) \bmod 2$, p=0, 1, 2, 3.

When a UE is semi-statically configured for UL MIMO transmission it can still be dynamically scheduled for single antenna port transmission via an UL grant with DCI format 0. If DCI format 0 permits triggering of sounding from multiple antenna ports, then all sounding parameters must be configured by higher layer signalling. This is because DCI format 0 only contains one bit for the SRS trigger.

Regardless of the manner of signalling only one cyclic shift should be signalled to the UE. The cyclic shift for the other antennas can be implicitly determined. Let the signalled cyclic shift be denoted as $\bar{n}_{SRS}^{cs}$. The cyclic shift value for up to 4 antenna ports is given as:

$$n_{SRS}^{cs,p} = (\bar{n}_{SRS}^{cs} + \Delta_p) \bmod 8$$

where: $\Delta_p$=0, 4, 2, 6 for respective antenna ports p=0, 1, 2, 3. Other patterns are not excluded In another embodiment $\Delta_p$=0, 2, 4, 6.

Antenna Port Activation

Not all transmit antennas need be configured for sounding. A UE with small to moderate UL Signal to Interference plus Noise Ratio (SINR) may not be configured for spatial multiplexing. The eNB decides if aperiodic sounding is required from only a subset of the antenna ports (block 309). Since the transmission comb and cyclic shift for additional antenna ports are implicitly signaled, the UE must be signaled which antenna ports are active for sounding.

This invention defines a bit map in the higher-layer signaled aperiodic SRS IE, where a 1 in position x indicates antenna port x is configured for aperiodic sounding (block 310). A 0 in position x indicates antenna port x is disabled from aperiodic sounding.

In another embodiment the number of antenna ports configured for aperiodic SRS is signaled to the UE, where the number can be 0, 1, 2, or 4.

Transmission Timing

For Rel. 8/9 periodic SRS transmission the SRS transmission instances are the subframes satisfying $(10n_f+k_{SRS}-T_{offset}) \bmod T_{SRS}=0$ where $k_{SRS}$ is defined for both Frequency Division Duplex (FDD) and Time Division Duplex (TDD).

For aperiodic sounding the UE commences aperiodic SRS transmission in subframe $k_{SRS}=n+k$, $k \geq 4$ upon detection of a positive SRS request in subframe n. A potential issue occurs if n+k is not a cell-specific SRS subframe. This invention includes three embodiments for UE behavior. In the first embodiment the UE assumes that consistent control information is not detected in the PDCCH and the UE disregards the PUSCH resource allocation and aperiodic SRS trigger. In the second embodiment the UE begins SRS transmission in subframe $k_{SRS}=n+k+m$, where m is the minimum positive integer satisfying $(10n_f+k_{SRS}) \bmod T_{SFC}=0$, $n_f$ is the system frame number and $T_{SFC}$ is the cell-specific subframe configuration period. In the third embodiment in addition to the UE-specific aperiodic SRS parameters listed in Table 2 the UE can also be configured with an aperiodic SRS configuration index which specifies the aperiodic SRS $T_{SFC-ap}$ and an aperiodic SRS subframe offset $T_{offset-ap}$. These parameters are similar to respective Rel. 8/9 periodic parameters $T_{SRS}$ and $T_{offset}$. The difference compared to Rel. 8/9 periodic sounding is that although the UE is configured with a time/frequency/code resource the UE does not transmit aperiodic SRS unless it receives a prior trigger. Therefore if a trigger is received in subframe n the UE shall commence SRS transmission in subframe $k_{SRS}=n+k'$ where the following conditions must be satisfied:

$$k_{SRS}=n+k', k' \geq 4$$

$$(10 \cdot n_f+k_{SRS}) \bmod T_{SFC}=0$$

$$(10 \cdot n_f+k_{SRS}-T_{offset}) \bmod T_{SRS}=0$$

From a radio resource management (RRM) perspective the first embodiment is the simplest option. The second embodiment increases the complexity of scheduling and RRM procedure at the eNB because the eNB has to carefully configure UEs to avoid collision of aperiodic SRS transmission. The same complexity issue is also introduced in the third embodiment. The third embodiment adds another parameter to the SRS IE, the aperiodic SRS configuration index but it has the advantage that a group of UEs can be configured with the same aperiodic time/frequency/code SRS parameters but only one UE from the group can be triggered for sounding in a specific subframe. Following calculation of the delay interval the delayed SRS transmission commences (block 311).

FIG. 4 illustrates the aperiodic SRS transmission timing rules for $T_{SRS-ap}=5$ ms. A positive trigger 401 is detected by the UE in subframe n+1. The UE transmits the corresponding aperiodic SRS transmission in subframe n+5 402 because n+5 is exactly four subframes later than the SRS trigger and it happens to be a UE-specific SRS subframe. Conversely, a positive SRS trigger is detected in subframe n+13 403 but four subframes later 404 is not a UE-specific SRS subframe. Therefore, the UE waits until subframe n+13 405 to transmit the aperiodic SRS.

Figure 5:
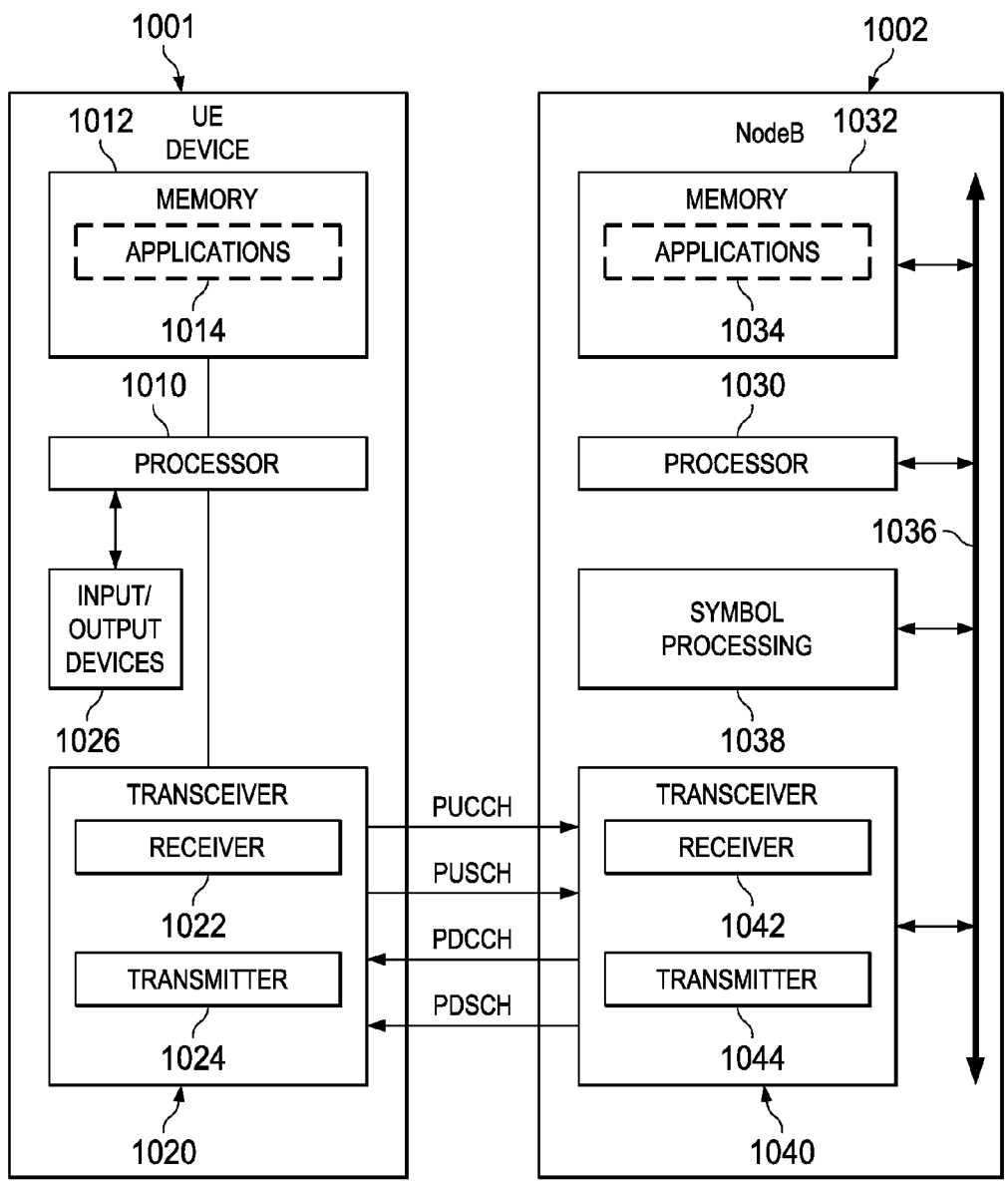
FIG. 5 is a block diagram illustrating internal details of a base station and a mobile user equipment in the network system of FIG. 1 suitable for implementing this invention.

FIG. 5 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VOIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VOIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of operating a user equipment (UE) in a cellular network, comprising the steps of:
   receiving by the UE radio resource control (RRC) signaling with a set of aperiodic sounding reference signal (SRS) parameters; configuring transmission comb and cyclic shift for all antenna ports via RRC signaling, said step of configuring cyclic shift for each antenna port includes
   receiving one value $n_{SRS}^{cs}$ by RRC signaling, and
   determining the cyclic shift for up to four configured antenna ports as $$n_{SRS}^{cs,p} = (\bar{n}_{SRS}^{cs} + \Delta_p) \bmod 8$$

where: $\Delta_p = 0, 4, 2, 6$ for respective antenna ports $p=0, 1, 2, 3$; and
   triggering transmission of an aperiodic SRS via one of one bit in a Downlink Control Information (DCI) format 0 transmission and one or more bits in a DCI format 4 transmission, wherein said DCI format is only present in the UE-specific search space.

2. A method of operating a user equipment (UE) in a cellular network, comprising the steps of:
   receiving by the UE radio resource control (RRC) signaling with a set of aperiodic sounding reference signal (SRS) parameters;
   triggering transmission of an aperiodic SRS via one of one bit in a Downlink Control Information (DCI) format 0 transmission and one or more bits in a DCI format 4 transmission, wherein said DCI format is only present in the UE-specific search space;
   commencing aperiodic SRS transmission at the UE in subframe $k_{SRS}=n+k$, $k \geq 4$ upon detection of a positive SRS request in subframe n; and
   if n+k is not a cell-specific SRS subframe and not a UE-specific SRS subframe then the UE commences SRS transmission in subframe $k_{SRS}=n+k'$ where the following conditions must be satisfied:

$$k_{SRS} = n+k', k' \geq 4$$

$$(10 \cdot n_f + k_{SRS}) \bmod T_{SFC} = 0$$

$$(10 \cdot n_f + k_{SRS} - T_{offset-ap}) \bmod T_{SRS-ap} = 0$$

where: $n_f$ is the system frame number, $T_{SFC}$ is the cell-specific subframe configuration period, $T_{offset-ap}$ is the UE-specific subframe offset and $T_{SRS-ap}$ is the UE-specific aperiodic SRS subframe periodicity.

3. A method of operating a user equipment (UE) in a cellular network, comprising the steps of:
   receiving by the UE radio resource control (RRC) signaling with a set of aperiodic sounding reference signal (SRS) parameters;
   triggering transmission of an aperiodic SRS via one of one bit in a Downlink Control Information (DCI) format 0 transmission and one or more bits in a DCI format 4 transmission, wherein said DCI format is only present in the UE-specific search space;
   commencing aperiodic SRS at the user equipment in subframe $k_{SRS}=n+k$, $k \geq 4$ upon detection of a positive SRS request in subframe n; and
   if n+k is not a cell-specific SRS subframe and not a UE-specific SRS subframe then the user equipment commences SRS transmission in subframe $k_{SRS}=n+k'$ where the following conditions must be satisfied:

$$k_{SRS} = n+k', k' \geq 4$$

$$(10 \cdot n_f + k_{SRS} - T_{offset-ap}) \bmod T_{SRS-ap} = 0$$

and
   $k_{SRS}$ is a cell-specific SRS subframe,
   where: $n_f$ is the system frame number, $T_{offset-ap}$ is the UE-specific subframe offset and $T_{SRS-ap}$ is the UE-specific aperiodic SRS subframe periodicity.

4. A method of operating a base station (eNodeB) in a cellular network, comprising the steps of:

transmitting radio resource control (RRC) signaling with a set of aperiodic sounding reference signal (SRS) parameters;
configuring transmission comb and cyclic shift for all UE antenna ports via RRC signaling, wherein said step of configuring cyclic shift for each antenna port includes signaling of one value $n_{SRS}^{cs}$ by RRC signalling,
where said user equipment determines the cyclic shift for up to four configured antenna ports as $$n_{SRS}^{cs,p} = (\tilde{n}_{SRS}^{cs} + \Delta_p) \bmod 8$$

where: $\Delta p = 0, 2, 4, 6$ for respective antenna ports $p=0, 1, 2, 3$; and
receiving transmission of an aperiodic SRS triggered via one of one bit in a Downlink Control Information (DCI) format 0 transmission and one or more bits in a DCI format 4 transmission, wherein said DCI format is only present in the UE-specific search space.

5. A method of operating a base station (eNodeB) in a cellular network, comprising the steps of:
transmitting radio resource control (RRC) signaling with a set of aperiodic sounding reference signal (SRS) parameters;
receiving transmission of an aperiodic SRS triggered via one of one bit in a Downlink Control Information (DCI) format 0 transmission and one or more bits in a DCI format 4 transmission, wherein said DCI format is only present in the UE-specific search space;
detecting an aperiodic SRS in subframe $k_{SRS}=n+k$, $k\geq 4$ upon transmitting a positive SRS request in subframe n; and
if n+k is not a cell-specific SRS subframe and not a UE-specific SRS subframe then detection of SRS transmission in subframe $k_{SRS}=n+k'$ where the following conditions must be satisfied:

$$k_{SRS}=n+k', k'\geq 4$$

$$(10 \cdot n_f + k_{SRS}) \bmod T_{SFC} = 0$$

$$(10 \cdot n_f + k_{SRS} - T_{offset-ap}) \bmod T_{SRS-ap} = 0$$

where: $n_f$ is the system frame number, $T_{SFC}$ is the cell-specific subframe configuration period, $T_{offset-ap}$ is the UE-specific subframe offset and $T_{SRS-ap}$ is the UE-specific aperiodic SRS subframe periodicity.

6. A method of operating a base station (eNodeB) in a cellular network, comprising the steps of:
transmitting radio resource control (RRC) signaling with a set of aperiodic sounding reference signal (SRS) parameter;
receiving transmission of an aperiodic SRS triggered via one of one bit in a Downlink Control Information (DCI) format 0 transmission and one or more bits in a DCI format 4 transmission, wherein said DCI format is only present in the UE-specific search space;
detecting an aperiodic SRS in subframe $k_{SRS}=n+k$, $k\geq 4$ upon transmitting a positive SRS request in subframe n; and
if n+k is not a cell-specific SRS subframe and UE-specific SRS subframe then detection of SRS transmission in subframe $k_{SRS}=n+k'$ where the following conditions must be satisfied:

$$k_{SRS}=n+k', k'\geq 4$$

$$(10 \cdot n_f + k_{SRS} - T_{offset-ap}) \bmod T_{SRS-ap} = 0$$

and
$k_{SRS}$ is a cell-specific SRS subframe,
where: $n_f$ is the system frame number, $T_{offset-ap}$ is the UE-specific subframe offset and $T_{SRS-ap}$ is the UE-specific aperiodic SRS subframe periodicity.

* * * * *